US012062292B2

(12) United States Patent
Mayfield et al.

(10) Patent No.: US 12,062,292 B2
(45) Date of Patent: Aug. 13, 2024

(54) UPDATABLE INTEGRATED CONTROL AND MONITORING SYSTEM

(71) Applicant: New Bedford Panoramex Corp., Claremont, CA (US)

(72) Inventors: Charles S. Mayfield, Diamond Bar, CA (US); Dean Munson, Pomona, CA (US); Steven Ozuna, Las Vegas, NV (US)

(73) Assignee: New Bedford Panoramex Corp., Claremont, CA (US)

( * ) Notice: Subject to any disclaimer, the term of this patent is extended or adjusted under 35 U.S.C. 154(b) by 906 days.

(21) Appl. No.: 17/004,723

(22) Filed: Aug. 27, 2020

(65) Prior Publication Data

US 2021/0065559 A1 Mar. 4, 2021

Related U.S. Application Data

(60) Provisional application No. 62/893,314, filed on Aug. 29, 2019.

(51) Int. Cl.
*G08G 5/00* (2006.01)
*G06F 11/20* (2006.01)
*G06F 13/42* (2006.01)

(52) U.S. Cl.
CPC ....... *G08G 5/0026* (2013.01); *G06F 11/2028* (2013.01); *G06F 13/4282* (2013.01); *G06F 2201/85* (2013.01)

(58) Field of Classification Search
CPC .......................... G08G 5/0026; G08G 5/0043; G06F 11/2028; G06F 13/4282; G06F 2201/85;
(Continued)

(56) References Cited

U.S. PATENT DOCUMENTS 4,442,504 A * 4/1984 Dummermuth ...... G05B 19/052
710/264
5,428,526 A * 6/1995 Flood ................. G05B 19/0421
700/12
(Continued)

FOREIGN PATENT DOCUMENTS

CN 203397279 U * 1/2014
EP 2237120 B1 * 10/2015 ......... G05B 19/0423
(Continued)

OTHER PUBLICATIONS

BayCat PC/104—Plus Single Board Computer. Product Data Sheet. VersaLogic, Corp, Feb. 1, 2019 [online], [retrieved on Jul. 15, 2023]. Retrieved from the Internet <URL: https://web.archive.org/web/20190201054850/https://www.versalogic.com/Products/PDF/DS-EPM-31-BayCat.pdf> (Year: 2019).*

*Primary Examiner* — Peter D Nolan
*Assistant Examiner* — Peter Y Ning
(74) *Attorney, Agent, or Firm* — Carlos A. Fisher; Stout, Uxa & Buyan, LLP (57) ABSTRACT

An updatable, single fault impervious integrated control and monitoring system (ICMS) for airfield avionics comprising at least a pair of I/O Processors connected in parallel by two separate networks to each of a) a plurality of workstations, preferably including a Master Workstation, and b) one or more Equipment I/O Interface backplanes; said one or more Equipment I/O Interface backplanes comprising one or more programmable Equipment I/O Interface circuit card plugged therein and being structured to be programmed to bidirectionally translate at least one of a plurality of signal types required for control and monitoring of avionic equipment and convert said at least one of a plurality of signal types to and from a common signal type usable by the I/O Proces-
(Continued)

sors. Methods of making and using the updatable, single fault impervious ICMS are also described.

18 Claims, 3 Drawing Sheets

(58) Field of Classification Search
CPC ............. G06F 11/2005; G06F 11/2015; G06F 11/2007
See application file for complete search history.

(56) References Cited

U.S. PATENT DOCUMENTS

| | | | |
|---|---|---|---|
| 5,764,924 A * | 6/1998 | Hong | G06F 13/4045 |
| | | | 710/315 |
| 5,933,656 A * | 8/1999 | Hansen | G06F 13/426 |
| | | | 710/64 |
| 5,978,578 A * | 11/1999 | Azarya | G05B 13/0275 |
| | | | 717/149 |
| 6,065,068 A * | 5/2000 | Foote | G06F 13/409 |
| | | | 710/36 |
| 6,604,030 B1 * | 8/2003 | Davis | G08G 5/0026 |
| | | | 714/E11.073 |
| 7,376,760 B1 * | 5/2008 | Ivchenko | G05B 19/4183 |
| | | | 702/108 |
| 10,872,044 B1 * | 12/2020 | Campbell | G06F 13/20 |
| 2003/0040881 A1 * | 2/2003 | Steger | G16H 40/40 |
| | | | 702/123 |
| 2005/0289274 A1 * | 12/2005 | Ghercioiu | G06F 8/51 |
| | | | 710/303 |
| 2013/0117766 A1 * | 5/2013 | Bax | G06F 9/4401 |
| | | | 719/323 |
| 2013/0132623 A1 * | 5/2013 | Sierk | G06F 13/385 |
| | | | 710/106 |
| 2014/0047137 A1 * | 2/2014 | Mathason | G05B 19/054 |
| | | | 710/33 |
| 2015/0145712 A1 * | 5/2015 | Castellanos | G01S 13/913 |
| | | | 342/33 |
| 2018/0061243 A1 * | 3/2018 | Shloosh | G08G 5/0043 |

FOREIGN PATENT DOCUMENTS

| | | | | |
|---|---|---|---|---|
| WO | WO-0182138 A2 * | 11/2001 | ......... | B61L 27/0094 |
| WO | WO-2015191121 A1 * | 12/2015 | ............ | H03K 19/00 |

* cited by examiner

UPDATABLE INTEGRATED CONTROL AND MONITORING SYSTEM

FIELD OF THE INVENTION

This invention relates to systems and methods for providing hardware and/or software updates to integrated control and monitoring systems for aircraft guidance and safety equipment at airports. In particular the invention relates to increasing airport safety and decreasing the potential for airport system failure by providing integrated systems that are structured to reduce the potential that any single component or communications failure, including equipment interfaces with airport Federal Aviation Administration equipment such as, without limitation, navigational aids (NAVAIDS) and visual aids (VISAIDS) can materially affect the functionality of the system.

BACKGROUND AND SUMMARY OF THE INVENTION

Airports contain a wide variety of equipment which air traffic control personnel use to aid in the process of launching and recovering aircraft in a safe and efficient manner. Typically, user interfaces to each item of this equipment is unique, because there is no common manufacturer of airport navigation aid (NAVAIDS) and visual aid (VISAIDS) equipment components, and because each different type of such equipment performs a different function.

User interfaces may be as simple as a panel of push buttons with incandescent lamps or as complex as a rack of switches and LEDs. In addition, the user interfaces are typically located in different locations such as the tower cab, scattered equipment cabinets, or at various field locations. Such equipment and interfaces may include runway lights, instrument landing systems (ILS), emergency generators, and other systems that ensure safe management of the aircraft.

Integrated control and monitoring systems (ICMS) have been proposed and installed in sixteen (16) airports in the U.S. National Airspace System (NAS) in which all these various user interfaces are connected to a common high-speed network of workstations. See U.S. Pat. No. 6,604,030, hereby incorporated herein by reference in its entirety. The advantages of such an integrated control and monitoring system are manifest; these include the fact that this system allows all the equipment and user interfaces to be displayed to a controller at a common location, with the system controls displayed in a graphical user interface (GUI) format that has a common "look and feel", and a common logic. Due to this common look and feel and common logic, air traffic controllers moving from one airport to another airport encounter familiar equipment at the new airport, thus reducing the time required to become familiar with the new airport, and consequentially increasing air safety.

An integrated monitoring and control system also allows the controller to selectively control and monitor all the airfield avionics equipment from one or more locations. ICMS systems may further provide computer-controlled interlocks to prevent human error. For example, each physical runway at an airport represents two "virtual" runways, one handling traffic in one direction, the other handling traffic in the opposite direction. Each of these virtual runways has its own set of equipment. It is therefore imperative that when the traffic direction on a physical runway is changed, the interlock refuses to turn on the equipment for the new virtual runway until the equipment (for example, the localizer and the glide slope transmitters) of the previous virtual runway has shut down.

In an important feature, integrated monitoring and control systems may provide a "fail-safe" architecture in which there can be no single point of failure of the ICMS system. Such ICMS systems commonly utilize a pair of identical redundant components for each element or module of the system that represents a single point of interface to remote equipment, and parallel-connected components that permit automatic switching from a first system to an identical second system in the event of a failure of communication between components of the first system.

ICMS systems are comprised of a group of computers linked together over a high speed Ethernet local area network (LAN) utilizing the Transport Control Protocol over Internet Protocol (TCP/IP) architecture. The computers are of two different types.

One type of computer is a commercially off the shelf (COTS) IBM compatible computer which is classified as an ICMS Remote Workstation. The ICMS Remote Workstation provides a user interface to ICMS-monitored equipment for the air traffic controller. There can be as many ICMS Remote Workstations as needed based on the number of user interfaces required. An ICMS Remote Workstation may be classified as either a Remote Master Workstation or Remote Slave Workstation. There may be only one Remote Master Workstation at any given time. The non-Remote Master Workstations are classified as Remote Slave Workstations.

The other type of computer is also COTS industrial grade computer and is classified as an ICMS Concentrator comprising a CPU and input/output (I/O) equipment interface cards. The overall design of these units is based on the STD-32 computer bus. Redundant pairs of Concentrators share a common interface to the remote equipment. Each Concentrator is connected to the Remote Workstations on its own LAN. The redundant pair of Concentrators are connected to each other through a digital interface which is used to provide status signals to each other. One Concentrator is active or primary at any given time. This means that it is providing the interface between the Remote Master Workstation and the remote avionics equipment (hereinafter FAA equipment).

The standby or secondary Concentrator monitors the status of the remote equipment and the control status of the primary Concentrator. If the primary Concentrator experiences a communication failure with the Remote Master Workstation, it will relinquish its primary Concentrator status to the secondary Concentrator and allow operational status and control between the Remote Master Workstation and the remote equipment to continue without interruption. Once the failed Concentrator reestablishes communications with the Remote Master Workstation, it becomes the inactive or secondary Concentrator.

Thus, this redundant system provides the paired Concentrators the ability to actively interface with, and control and monitor) the FAA equipment (in the case of the active primary Concentrator), and (in the case of the active secondary Concentrator) the ability to simultaneously monitor the status of the active primary Concentrator interface and thus prevent the Concentrator function from representing a single point of failure for ICMS.

This ICMS system also provides another important feature: status and control archiving. Each of the Concentrators maintains an archive file where it records all status changes received from, and controls sent to, the remote FAA equipment. Each archive entry is time and date stamped which allows FAA and airport personnel to recreate valuable historic remote equipment status changes and controller interaction with the remote FAA equipment in the case of an accident.

The U.S. Federal Aviation Administration (FAA) manages and regulates all aspects of civil aviation in the United States as well as over its surrounding international waters. Its powers include airport and air traffic management, and the certification of personnel, aircraft and avionic equipment. The FAA has long been the world's gold standard for air safety, with other countries often adopting FAA standards.

In 2007 the FAA began a long-term modernization project of the United States' National Airspace System (NAS), called NextGen. The goals of NextGen include using new technologies, equipment, and procedures to increase the safety, efficiency, capacity, access, flexibility, predictability, and resilience of the NAS. This project is particularly necessary since many air traffic control systems still use 1930's era radio and 1950's era radar systems, and rely on air traffic controllers walking information to each other across the room on pieces of yellow paper strips.

Despite the tremendous improvement to air safety provided by ICMS systems, existing ICMS systems continue to have a number of drawbacks. Each airport has a different array of FAA equipment, including similar NAVAID and VISAID equipment made by different manufacturers. As a result items of equipment, even those serving a similar or identical function may have very different I/O requirements and interfaces, including, for example without limitation, modem links, RS 232 interfaces, and digital I/O interfaces. Since the Concentrators responsible for both I/O processing and the I/O interface with FAA equipment, this means that FAA equipment interfaces between the Concentrators and airport equipment such as, without limitation, navigational aids (NAVAIDS) and visual aids (VISAIDS), require extensive custom hard wiring of rack hardware interfaces in the Concentrator for each type of equipment.

This fact means that, despite being COTS computers, Concentrators at any given airport are made unique through customization, and any change to such a system (such as the substitution of an item of FAA equipment with another item of FAA equipment, or the addition of a new item of FAA equipment) is a laborious process involving extensive rewiring of equipment interfaces and/or between racks.

Furthermore, prior Concentrators connected FAA equipment at the I/O interface cards in groups of four or more; thus, when a circuit card interfacing with FAA equipment needs to be replaced (due to, for example, a failure, substitution or other change of a single item of FAA equipment) the entire subsystem containing the card must be shut down, thereby risking failure or downtime for up to three or more other items of FAA equipment (or even the entire ICMS system) until the substitution is made or any other problem is solved and/or new I/O interface hard wiring is complete. This results in a system that has a non-redundant subsystem for the connection to the FAA equipment. In addition, since each circuit card interfaces with multiple pieces of FAA equipment, if a card fails, it can affect multiple pieces of FAA equipment.

As airport safety and navigational equipment and older ICMS system components age, ICMS systems require updating and standardization. For example, ICMS computer workstations and hardware components, such as Concentrator hardware have become obsolete and non-custom CPU cards for this computer bus are no longer manufactured. Similarly, the software originally used in the ICMS systems requires replacement or updating with current software. As FAA equipment is replaced, there is a need for an improved ICMS system architecture to standardize and modernize ICMS systems throughout the NAS and from airfield to airfield, and to provide a single system, with a single user interface that can accommodate updates made to system components while continuing to monitor and control FAA equipment and maintain protection against a single point of system failure.

SUMMARY OF THE INVENTION

The present invention revises the ICMS architecture to provide improved, updated, standardized, and modernized ICMS systems so that a single user interface can accommodate updates made to system components and equipment differences from airfield to airfield, and without shutting entire subsystems down.

ICMS-monitored and/or controlled equipment and functions ("FAA equipment") may include, without limitation, one or more of: Instrument Landing Systems (ILS); Runway Visual Range Equipment (RVR); Distance Measuring Equipment (DME); Runway End Identifier Lights (REIL); Precision Approach Path Indicator (PAPI) light arrays, Medium Intensity Approach Lighting Systems (MALS); Omni-Directional Approach Lights (ODALS); Approach Lighting System with Sequenced Flashing Lights (ALSF), Non-Directional Beacons (NDB); Localizer equipment; Glide Slope equipment; Markers, Far Field Monitors; Visual Approach Slope Indicator (VASI) equipment; facility power configuration and status, recording equipment configuration and status, airfield telecommunications infrastructure control and monitoring. In most cases, each item of FAA equipment is available from and fabricated by different manufacturers, resulting in variations in their hardware interface requirements for control and monitoring.

The present invention is directed to an improved integrated control and monitoring system (termed "ICMS Refresh") for airfield and airport equipment, including one or more of ILS and instrument and visible navigational aids, and airfield lighting systems, which is single-fault impervious, and which is easily configured to provide a single user interface (such as a graphic user interface (GUI)) for the control and monitoring of a plurality of different equipment types, equipment manufacturers, and airfields.

In addition to the replacement of aging and obsolete components, such as Time Servers and Ethernet switches and the replacement of cabinet-based workstations with newer mini desktop-style workstations, the improved ICMS Refresh system involves major changes from the previous system.

In one such major change, the previous COTS Concentrator hardware is retired, and its functions are completely redesigned. The Concentrator design combined both CPU and I/O interface functions. These two subsystems are now split into two distinct components: a I/O Processor redundant subsystem and an Equipment I/O subsystem.

In the ICMS Refresh system the I/O Processors are stand-alone PC/104 COTS Intel processor-based CPU cards. The Equipment I/O subsystem is a single, non-commercial design containing common designed circuit cards that interface to any single piece of FAA equipment. The result is that the overall Equipment I/O subsystem architecture is essentially identical among all airfields, with programmable I/O interface circuit cards that plug into the main I/O subsystem and permit the system to interface with the specific combination of FAA equipment present in each airport.

Thus, the ICMS Refresh I/O interface is a single hardware design used to interface to all supported FAA equipment.

Software for any of these items of FAA equipment may be loaded into the I/O Interface circuit card using an SD card slot present on the card. The software selects the appropriate communications and/or digital interfaces to control and monitor the desired item of FAA equipment. Each I/O Interface circuit card also comprises LED indicators that provide operational and functional feedback for maintenance personnel. The I/O processors send commands to, and receive status from the appropriate I/O interface circuit card using an RS-422 communications port. A second RS-422 communications port is available on each card for use by maintenance personnel to provide I/O interface diagnostics and manual control of controllable FAA equipment if necessary or desired.

In the Concentrator I/O equipment interface of the previous ICMS system a single item of equipment often required complex wiring to the interface and sometimes between racks. For example, an FSK modem interface with a Concentrator I/O may require the hard wiring and connection of 22 wires. By contrast, in the present invention the use of the custom programmable I/O interface circuit cards plugged into slots of a general purpose backplane of the Equipment I/O module only requires minimum wiring; in most cases two wires.

The Equipment I/O backplanes are connected to the I/O Processor subsystem using RS-422 communication lines. They also interconnect with each other for easy system scalability, for example, when new FAA equipment is added or removed.

As a result of these improvements the ICMS Refresh system of the present invention may be easily and quickly modified due to revision or addition of FAA equipment, software updates, firmware updates and the like. For example, a new (or revised) Equipment I/O circuit card may simply be plugged into a spare slot of the "general purpose" backplane in the Equipment I/O subsystem. The communication link of the Equipment I/O card is then connected to the new or revised FAA equipment.

In another major advantage, the I/O interface circuit cards of the Equipment I/O subsystem are "hot swappable", meaning that the ICMS Refresh system and its subsystems (including the Equipment I/O subsystem) do not need to be shut down when an I/O circuit card is unplugged and replaced with a revised I/O circuit card. Thus, when FAA equipment is replaced, repaired, or added the ICMS Refresh system remains active, permitting the redundant, single-fault impervious airfield control and monitoring functions to continue while an item of FAA equipment is maintained or changed.

The present invention will now be described in further detail.

DETAILED DESCRIPTION OF THE INVENTION

Typically, an Air Traffic Controller (ATC) is responsible for operations on one or more runways. AT controllers must know what avionics equipment is available, and be able to immediately and efficiently adjust and change runway parameters, for example, to adjust the brightness of runway approach lights, or switch directions of approach landing systems when the wind and winds speed changes.

These tasks can become quite complex in large airports because of the number and diverse types of avionics-related FAA equipment. The present integrated control and monitoring system ("ICMS Refresh") is a real time status and control system that is used to simplify these tasks. Multiple workstations, distributed throughout the tower and facility, provide real time status and control of the various types of FAA equipment.

The ICMS Refresh design is fully redundant, consisting of a mutually independent pair of highspeed local area networks (LANs), one or more pairs of equipment room-based I/O Processors, one or more Equipment I/O subsystems (each connected to the I/O Processors and comprising an I/O backplane and one or more programmable Equipment I/O circuit cards), one or more pairs of Time Servers, and multiple air traffic control tower workstations, preferably with touch screen displays and controls, providing monitoring and control functions for all airfield FAA equipment, such as NavAid and VisAid equipment. Each workstation has a pair of LAN (e.g., Ethernet) interfaces to permit the workstation to connect to both of the independent LAN networks.

The Equipment I/O subsystem(s) provide the interface to one or more airfield landing systems and collect real time status that is sent to the workstations. They also relay workstation-generated commands to the airfield FAA equipment (including landing systems) via the I/O Processors. In addition, the I/O Processors are responsible for monitoring, registering and recording airfield landing system status changes, commands that are sent to the airfield FAA equipment and the ICMS Refresh system and network related events; these data are recorded and archived in daily log files. The Time Servers are used to provide accurate time stamping of these recorded events, as well as providing an accurate common time source for the workstations of the ICMS Refresh system.

Workstations are placed into one of three capability groups: The Master Capable group, the Client group and the Display Only group. Within the Master Capable group, only one workstation can assume Master Control at a time. The Master Workstation is the center point of the operational ICMS Refresh system; all data flows in and out of the Master Workstation. All of the other workstations in the Master Capable group demote themselves to Client capability. There is a predefined priority list that determines the order in which a workstation within the Master Capable group can become the Master Workstation. It should be noted that Master Control is a capability of a given workstation and does not refer to a workstation located at a single physical location.

Master Control can move to any workstation contained in the Master Capable group either on request or due to network or computer failures. The Master Workstation is the only location where Instrument Landing System (ILS) and DME (Distance Measuring Equipment) control is allowed. Workstations that are at least Client capable can control the airfield lighting systems. Workstations that are in the Display group can only display current status, and are not permitted to control any airfield equipment.

At any point in time only one I/O Processor of an I/O Processor pair interacts with the I/O Equipment interface (and FAA equipment) and the Master Workstation. This I/O Processor is called the Active I/O Processor. The second I/O Processor of an I/O Processor pair is the called the Standby I/O Processor. The Standby I/O Processor monitors incoming data from the airfield equipment, the operational state of the Active I/O Processor, and the operational state of the network path between itself and the Master Workstation. If there is a failure of the network path between the Active I/O Processor and the Master Workstation, and the Standby I/O Processor is operational and detects a good network path to the Master Workstation, the Active I/O Processor will signal the Standby I/O Processor to switch roles. The new Active I/O Processor will then begin to interact with the Master Workstation and I/O Equipment interface.

If the Active I/O Processor fails, the Standby I/O Processor automatically assumes the role of the Active I/O Processor even if it cannot find a good network path to the Master Workstation. The Master Workstation can also request the I/O Processor pair to switch roles. Communication between the Master Workstation and other workstations can take place on either LAN network. The network path that is used is switched automatically if a network path or Workstation hardware error is detected.

For training purposes a portable, standalone, ICMS Refresh training system provides airport personnel with the ability to interact with and learn the operation of the ICMS system without being connected to FAA equipment, and thus without disruption of airport operations.

Figure 1:
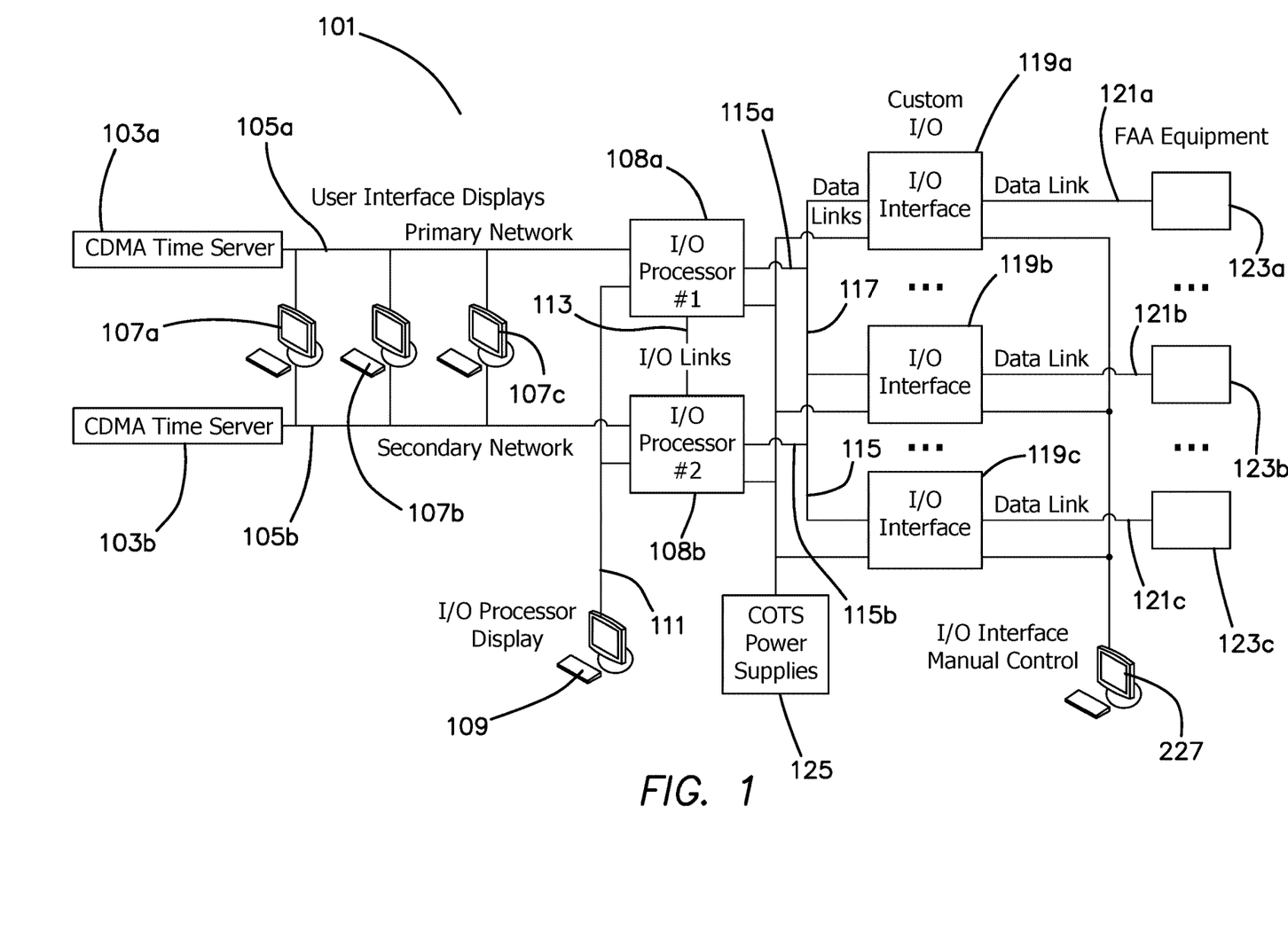
FIG. 1 is a schematic overview of an embodiment of the integrated control and monitoring system of the present invention.

FIG. 1 shows an overview of a basic embodiment of the ICMS system of the present invention 101. A pair of Time Servers 103a and 103b are connected via separate local area networks (LANs, shown as Primary Network 105a and Secondary Network 105b) to each of three workstation (107a, 107b, 107c) in parallel, thus ensuring that each workstation has common times sources, and that each workstation is in connected to and in communication with both the Primary Network and the Secondary Network. Preferably the LAN is an Ethernet local area network. The Workstation displays are generally substantially similar, and comprise touch screens for the visualization of the status of FAA equipment. One of these workstations is designated a Master Workstation, through which all ICMS Refresh data flows, while other Workstations are Client Workstations or Display Only Workstations.

In the example shown, the Primary Network (105a) is connected to I/O Processor 1 (107a), and the Secondary Network (105b) is connected to I/O Processor 2 (107b). Each identical I/O Processor comprises a COTS embedded processor running an I/O interface software application. An I/O Display Workstation (109) is connected directly to both I/O Processor 1 (107a) and I/O Processor 2 (107b) on a separate display data line (111) for monitoring purposes. The I/O Display Workstation is a COTS device that has a built-in keyboard and can be used by technicians for configuration and troubleshooting.

The pair of I/O Processors (107a, 107b) are also linked by a plurality of digital I/O data links (113), which will be described in greater detail below.

As shown in FIG. 1, each I/O Processor is linked via separate network data links (115a, 115b) to a common data link (117) conveying input and output data to and from each of a plurality of I/O Interfaces (shown here as 119a, 119b, 119c). Each I/O Interface (119a, 119b, 119c) comprises a general purpose backplane having a plurality of slots into which one or more programmable I/O Interface circuit card is plugged to provide a custom (non-COTS) I/O interface for each item of FAA equipment to be controlled and/or monitored at the airfield. The common data link (117) also joins the I/O Interfaces (119a, 119b, 119c). The I/O Interfaces and the I/O Processors preferably receive power from redundant COTS power supplies (a single such power supply is shown as 125).

The programmable I/O Interface circuit card, which will be described in greater detail below, is a custom, programmable card having the capability of being programmed to provide an I/O interface with any commonly used item of FAA equipment. Thus, each I/O Interface backplane will commonly comprise a plurality of programmable I/O Interface circuit cards having identical or substantially identical hardware characteristics, but which may be individually programmed to provide different I/O interface characteristics. The programmable I/O Interface circuit cards thus provide the ICMS Refresh system the capability of providing a functional ICMS system comprising identical hardware to a plurality of airfields, each of which may have very different FAA equipment complements and I/O interface requirements. Moreover, the use of the I/O Interfaces comprising programmable I/O Interface circuit cards allows each item of FAA equipment to be easily and quickly connected to the ICMS system simply by downloading the appropriate custom software into the I/O Interface circuit card. It also reduces the number of wired connections between FAA equipment to the ICMS system from, for example, 22 wires for some modem-based FSK (frequency shift keyed) transmitting/receiving FAA equipment, to only two wires. Thus, the programmable I/O Interface circuit cards act as "translators" between the FAA equipment and the ICMS system.

Thus, FIG. 1 shows the data links (121a, 121b, 121c) from the I/O Interfaces (119a, 119b, 119c) respectively to items of FAA Equipment (123a, 123b, 123c).

It will be understood that FIG. 1 provides an illustrative depiction of an embodiment of an ICMS Refresh system, and that the present invention is not limited to this or any other specific embodiment. For example (and without limitation) the example showing in FIG. 1 depicts three workstations (107a, 107b and 107c). A given airfield may commonly have a greater (or even fewer) number of workstations and still fall within the scope of the invention. Similarly, FIG. 1 shows three I/O Interface modules (119a, 119b, 119c), but the amount of FAA equipment varies from airfield to airfield, and as many as 15 or 20 I/O Interfaces may be employed at some airfields. Furthermore, some larger airports may require or benefit from more than one ICMS system for the control and monitoring of different airfields or runways in the same airport.

Figure 2:
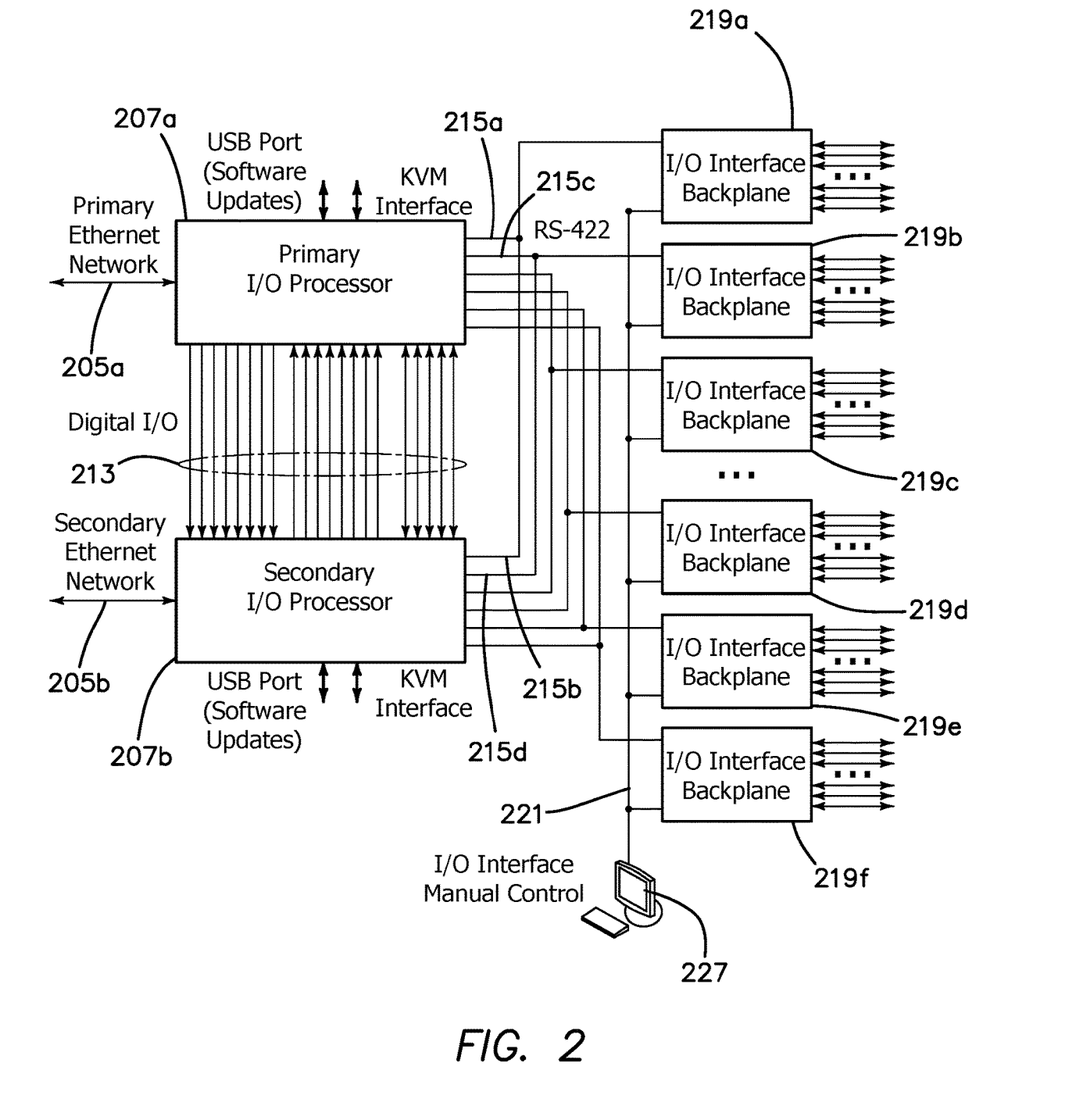
FIG. 2 is a schematic view of the system communications of an embodiment of an integrated control and monitoring system similar to that shown in FIG. 1, showing the I/O Processors and I/O Interface subsystem and their connections to FAA field equipment.

Turning now to FIG. 2, a more detailed view is shown of the configuration of an I/O Processor pair (207a, 207b) with Equipment I/O Interface Backplanes (219a, 219b, 219c, 219d, 219e, 219f).

The I/O Processors are part of the electronics assembly that is installed in the airport traffic control tower (ATCT) equipment room. Each I/O Processor is a single board computer running the LINUX operating system and the I/O Interface application. The I/O Processors are responsible for executing the control and display functions required by the user interface displays (workstations) that may be located throughout the airport facility. The I/O Processors also record equipment commands and status indications that are sent to and received from the I/O Interfaces. This information is transferred on a daily basis to a User Interface Display located in the equipment room for archival purposes. The I/O Processor Display is used for system operation details, maintenance and configuration.

The I/O Processors are connected by data link lines 213 permitting the exchange between the Primary I/O Processor 207a and Secondary I/O Processor 207b of a plurality of data items. These links typically and preferably convey information including one or more of:

Digital I/O data;
Primary Heartbeat (information indicating the operational status of the Primary I/O Processor);
On-line status of the Primary I/O Processor;
status information indicating whether the Primary I/O Processor is actively transferring logfile data;
Secondary Heartbeat (information indicating the operational status of the Secondary I/O Processor);
On-line status of the Secondary I/O Processor;
status information indicating whether the Secondary I/O Processor is actively transferring logfile data;
whether the Active I/O Processor is online;
whether the Standby I/O Processor is available;
Primary I/O Processor status;
Standby I/O Processor status;
I/O Interface subsystem power supply status.

Those of ordinary skill in the art will recognize that in some cases additional or different information may be transmitted between the Primary I/O Processor and Secondary I/O Processor. Thus, while the items in the list above are typical of the data exchanged between the Primary I/O Processor and Secondary I/O Processor, in a given instance a greater or lesser number of data items may be exchanged.

In the embodiment shown in FIG. 2, each of the Equipment I/O Interface Backplanes (219a, 219b, 219c, 219d, 219e, 219f) is connected to both the Primary I/O Processor and the Secondary I/O Processor using individual lines, preferably using an RS-422 communication line, which permits bidirectional data flow of input and output. For example, FIG. 2 shows I/O Interface Backplane 219a is connected to Primary I/O Processor 207a using data links 215a, and to Secondary I/O Processor 207b using data links 215b, while I/O Interface Backplane 219b is connected to Primary I/O Processor 207a using data links 215c, and to Secondary I/O Processor 207b using data links 215d. I/O Interface Backplanes 219c, 219d, 219e, and 219f are similarly individually connected to the Primary I/O Processor and the Secondary I/O Processor.

Additionally, FIG. 2 shows that each of Equipment I/O Interface Backplanes (219a, 219b, 219c, 219d, 219e, 219f) are separately connected to each other by a common bidirectional I/O line 221 (preferably, but not necessarily, an RS 422 communications line) which is also connected to a COTS workstation 227 having a monitor and keyboard for providing maintenance and manual control of each of the I/O Interfaces.

As described above particularly with reference to FIG. 1, and in more detail below, each of the I/O Interface Backplanes comprise a plurality of slots into which individual programmable Equipment I/O Interface circuit cards may be plugged to act as "translators" between the I/O Processors running the ICMS and Equipment I/O Interface software programs and individual items of FAA equipment, such as NavAid and VisAid equipment.

Figure 3:
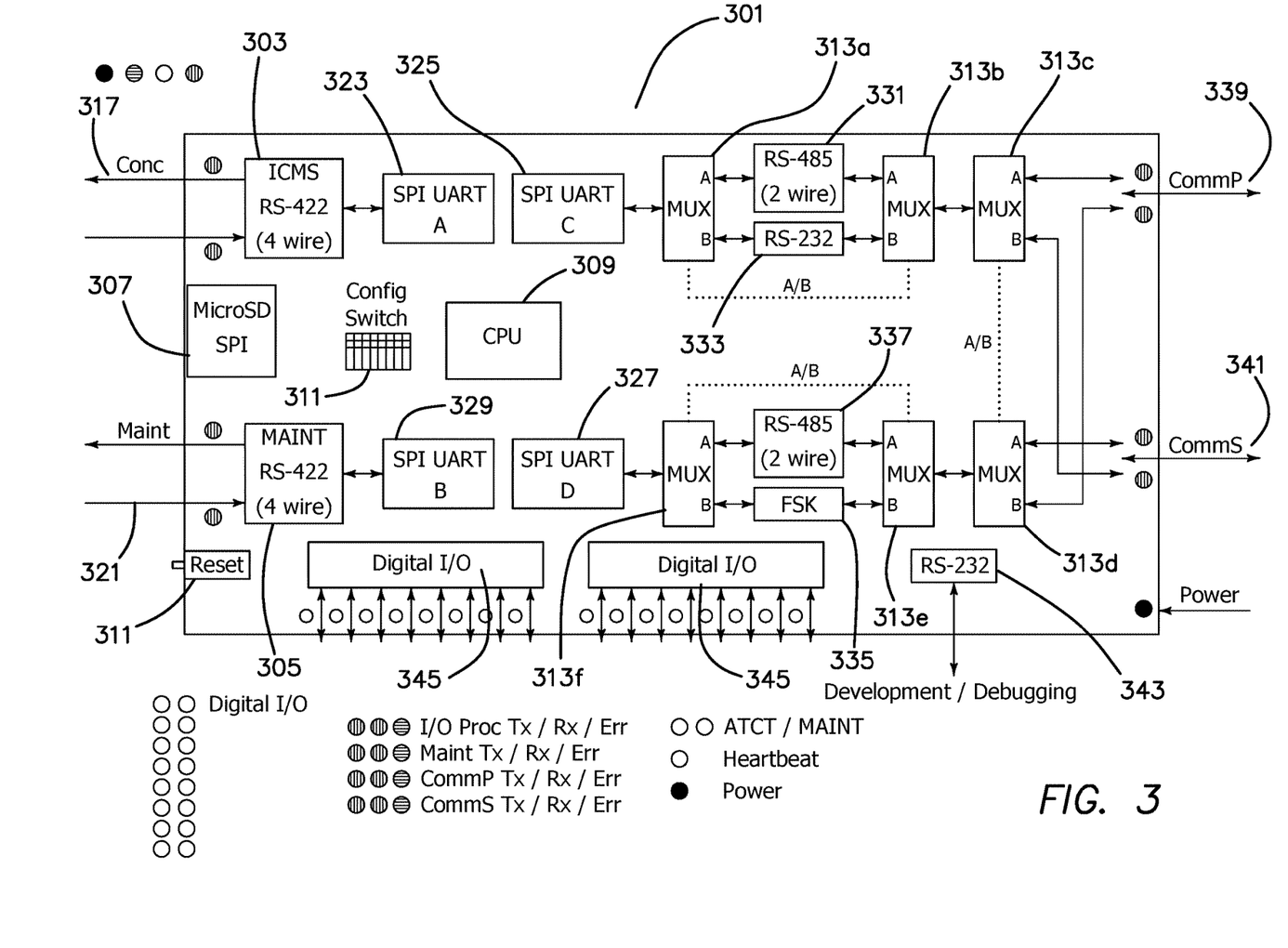
FIG. 3 is a schematic view of programmable I/O Interface circuit card of an integrated control and monitoring system of the present invention.

Turning now to FIG. 3, a "generic" programmable Equipment I/O Interface circuit card 301 is depicted schematically. The I/O Interface circuit card is connected to the I/O Processors through a first bidirectional communication line 317, in this case an RS-422 line comprising 4 wires, two of which are used for control input to the FAA equipment and two of which are used for monitoring output from the FAA equipment. The first bidirectional communication line 317 establishes a communication link between the programmable Equipment I/O Interface circuit card 301 and the Equipment I/O Interface software and ICMS system software running on the I/O Processors. The first bidirectional communication line 317 interfaces with the I/O Interface circuit card 301 through a ICMS comm module 303 on the card.

Output signals, such as control signals, are routed from I/O Processors via first bidirectional communication line 317 and ICMS comm module 303, and then passed to SPI UART A (323), which functions as a translator of language characters into signals (and vice versa) to convert output signals from the I/O Processors (see FIG. 2, 207a, 207b) into usable input for the CPU 309 of the programmable Equipment I/O Interface circuit card 301. This translated signal is then passed to the CPU 309. Depending upon the software instructions previously loaded into the CPU 309 from the SD card loaded into the SD card slot 307, the output signal is then further translated and processed according to this software to be usable by the specific item of FAA equipment for which the card has been programmed. The processed output signal is then routed either to SPI UART C (325) or SPI UART D (327), depending upon the identity of the item of FAA equipment, and routed as will be discussed below. Input signals from FAA equipment are routed in the same manner, in reverse.

A second bidirectional communication line 321 establishes a communication link between the programmable Equipment I/O Interface circuit card 301 and the COTS maintenance workstation having a monitor and keyboard for providing maintenance and manual or computer control of one or more of the Equipment I/O Interfaces. (See FIG. 2, 227). Second bidirectional communication line 321, also preferably an RS-422 line comprising 4 wires, interfaces with the I/O Interface circuit card 301 through a Maint comm module 305 on the card. This signal is the routed to SPI UART B (329) for translation of input and output signals (such as control signals) useable by the maintenance workstation.

The card contains structural features (such as slots) providing the programmable Equipment I/O Interface circuit card 301 the capability to receive and load software programming. In a currently preferred embodiment a Secure Digital (SD) card slot 307 present on the programmable Equipment I/O Interface circuit card 301 provides access to the card's CPU 309 by software residing on an SD card (not shown) plugged into the SD card slot 307. The software on the SD card is customized to provide I/O interface instructions to the programmable Equipment I/O Interface circuit card 301 permitting proper communication with and connection to each specific item of FAA equipment to which the programmable Equipment I/O Interface circuit card is connected. Insertion of a SD Card in the SD Card slot 307 triggers a reprogramming sequence of the Equipment I/O Interface program that resides in the Flash Memory contained on the CPU 309 with the Equipment I/O Interface Application program contained on the SD Card. The SD Card is then removed from the SD Card slot 307, allowing the Equipment I/O Interface Application program to execute.

Further customization/configuration instructions may also be provided to a given programmable Equipment I/O Interface circuit card 301 by use of the configuration switch 311 (such as, for example, a binary DIP switch) contained on each card. For example, certain items of FAA equipment, such as precision approach path indicator lights (PAPI), are manufactured by different companies or in different models; programming the card using the configuration switch 311 can provide additional instructions to the CPU 309 of programmable Equipment I/O Interface circuit card to customize the behavior of the card to function with a specific model or manufacturer for that item of FAA equipment. The configuration switch is also used to provide a unique card identification assignment so the I/O Processors can interact with each Equipment I/O Interface by using that card identification assignment in messages sent via the communication lines 215 and 221.

The programmable Equipment I/O Interface circuit card 301 further preferably provides a reset or reboot switch 311 permitting the manual clearing and restarting of the CPU 309 of the card.

The programmable Equipment I/O Interface circuit card 301 also comprises a plurality of two-way multiplexer/demultiplexer (MUX) switches; in FIG. 3, six MUX switches are shown as 313a, 313b, 313c, 313d, 313e, and 313f. Although single lines in FIG. 3 indicate the MUX switch routing paths, in reality these are actually pairs of signal wires. Multiplexers select between several analog or digital input signals and forward the selected signal to a single output line. Demultiplexers (contained in the same MUX switch) receive a single analog or digital signal and route the signal to a selected output line. The MUX switches shown in FIG. 3 are 2-to-1 multiplexers (in which the two potential input signals to be routed are designated A and B) and 1-to-2 demultiplexers (in which the two potential input signals to be routed are designated A and B). As can be seen in FIG. 3, signals may flow in both directions through each of the MUX switches in the present invention, and in certain cases the output of a MUX may be the direct input of another MUX switch (for example, see MUX pairs 313b, 313c and 313d, 313c). The behavior of these MUX switches in each card is dictated by the custom software instructions that resides on the CPU 309.

As indicated above, an output signal to the FAA equipment originating from an I/O Processor (FIGS. 2, 207a and 207b) is routed to SPI UART C (325) or SPI UART D (327), depending upon the identity of the item of FAA equipment.

If the signal from CPU 309 is routed to SPI UART C 325, the signal is directed to MUX switch 313a, as shown in FIG. 3. The custom software program residing on CPU 309 then causes MUX switch 313a to route the signal either to:

A) MUX output A, following which the signal is converted into a signal suitable for an RS-485 (2-wire) duplex connector at module 331, and then routed via MUX switch 313b (input A) and MUX switch 313c (output A or B depending upon the software instructions loaded into CPU 309) to Primary Communications port CommP 339 or Secondary Communications port CommS 341, respectively, or B) MUX output B, following which the signal converted into a signal suitable for an RS-232 connector at module 333, and then routed via MUX switch 313b (input B) and MUX switch 313c (output A or B depending upon the software instructions loaded into CPU 309) to Primary Communications port CommP 339 or Secondary Communications port CommS 341, respectively.

MUX 313a and MUX 313b are programmed or configured to form a "MUX pair", defined herein to mean that output channel (e.g., A or B) selected for one member of the pair is always selected as the input channel for the other member of the pair. Thus, if MUX 313a is programmed to route the signal to output A, then MUX 313b is always programmed to receive a signal from input A, and if MUX 313a is programmed to route the signal to output B, then MUX 313b is always programmed to receive a signal from input B. MUX 313c and MUX 313d form another MUX pair in the present invention, and MUX 313e and MUX 313f form a third MUX pair in the present invention.

If the signal from CPU 309 is routed to SPI UART D 327, the signal is directed to MUX switch 313f, as shown in FIG. 3. The custom software program residing on CPU 309 then causes MUX switch 313f to route the signal either to:

A) MUX output A, following which the signal is converted into a signal suitable for an RS-485 connector at module 337, and then routed via MUX switch 313e (input A) and MUX switch 313d (output A or B depending upon the software instructions loaded into CPU 309) to Secondary Communications port CommS 341 or Primary Communications port CommP 339, respectively, or B) MUX output B, following which the signal is converted into a signal suitable for an FSK connector at module 335, and then routed via MUX switch 313e (input B) and MUX switch 313d (output A or B depending upon the software instructions loaded into CPU 309) to Secondary Communications port CommS 341 or Primary Communications port CommP 339, respectively.

Certain FAA equipment may require that dual communications I/O interfaces be available at the same time. For example, without limitation, certain RVR (runway visual range) and ILS (instrument landing system) equipment may require that information be available to be transmitted and/or received at both CommP 339 and CommS 341 ports. In such cases, the software loaded into the I/O Interface circuit card 301 instructs the CPU 309 to send routing instructions to both SPI UART C (325) or SPI UART D (327) at the same time. In this event any combination of:

i) signals suitable for 2 RS-485 serial connectors,
ii) signals suitable for an RS-485 serial connector and an RS-232 serial connector,
iii) signals suitable for an RS-485 connector and an FSK connector, and
iv) signals suitable for an RS-232 connector and an FSK connector can be routed to CommP 339 and CommS 341, respectively, or CommS 341 and CommP 339, respectively, by the specific software loaded into the CPU of the card, as customized for the requirements of that item of FAA equipment.

The routing logic has been described above with respect to output signals (such as control signals) sent by the Master I/O Processor to the FAA equipment. However, input monitoring signals from the FAA equipment to the Master I/O Processor take exactly the same route (in reverse) as output signals in a given programmed I/O Interface circuit card 301. Thus, as an illustrative example, an RS-232 input signal received at CommP 339 is routed according to the software by MUX 313c line A and then MUX 313b line B into the RS-232 module 333, wherein the signal is translated from an RS-232 signal into a form that may be used by SPI UART C 325. MUX switch 313a receives the input signal from line B and delivers it to SPI UART C 325, whereupon the signal is translated into a character-containing monitoring data signal, passed to the CPU 309 and SPI UART C 323 for further translation into signals recognized by the I/O Processors, and routed to the I/O Processors via RS-422 module 303 and I/O data line 317.

In a preferred embodiment the programmable Equipment I/O Interface circuit card may possess a serial or parallel port for development and debugging. FIG. 3 shows a serial RS-232 port 343 which may be used for this purpose.

Furthermore, the programmable Equipment I/O Interface circuit card may comprise digital I/O channels 345 which may be plugged into a connector in the I/O Interface backplane for additional or auxiliary bidirectional digital signal(s) between an item of FAA equipment and the ICMS Refresh system. Generally the connector is wired directly into the item of FAA equipment.

The programmable Equipment I/O Interface circuit card may also comprise a plurality of LEDs (show in FIG. 3 as small filled or unfilled circles). The LEDs may be used, for example, to show digital ON/OFF state—at a given channel of the Digital I/O interface 345, indication of I/O Processor signals at first bidirectional communication line 317 showing transmission, receipt or error; indication of I/O maintenance signals at second bidirectional communication line 321 showing transmission, receipt or error; indication of I/O maintenance signals at CommP 339 showing transmission, receipt or error; indication of I/O maintenance signals at CommS 341 showing transmission, receipt or error, a power indicator LED showing whether the programmable Equipment I/O Interface circuit card is receiving power, and a "heartbeat" LED indicating whether the programmable Equipment I/O Interface circuit card is functioning correctly. These LED parameters may be altered or changed to apply to a given item of FAA equipment by the custom software loaded into the circuit card's SD card slot.

Using the above-described routing algorithms for selected FAA equipment, programmable Equipment I/O Interface circuit cards 301 may be programmed, without limitation, as follows. All I/O communication to and from I/O Processors 317 and the maintenance and manual or computer control workstation 321 are via RS-422 inputs 303 and 305, respectively. The following are simply examples and the invention is not limited to these examples.

a) A custom programmable Equipment I/O Interface circuit card may be programmed for the MK20 ILS system, so that the circuit card is capable of receiving inputs from the FAA equipment including RS-232, +13.5 V voltage monitoring, DME (direction monitoring equipment) status signals, Interlock conflict (shutdown) signals and Interlock status signal inputs, and outputs to the FAA equipment including Interlock control, Interlock Enable signals, FFM (far field monitor) bypass signals, and FSK DME (direction monitoring equipment) signals. Digital I/O in this circuit card may include DME reset signal output signals and DME status input signals.

b) A custom programmable Equipment I/O Interface circuit card may be programmed for an airport beacon (AB), so that the circuit card is capable of receiving inputs from the FAA equipment including FSK airport beacon status and parameter data, and sending FSK airport beacon control signals and on/off control signals to the FAA equipment.

c) A custom programmable Equipment I/O Interface circuit card may be programmed for communication with the approach landing system with sequenced flashing lights (ALSF) FAA equipment manufactured by Airflo and Godfrey, so that the circuit card is capable of receiving inputs and sending control signals to the FAA equipment using FSK communication.

d) A custom Equipment circuit card may be programmed for communication with the approach landing system with sequenced flashing lights (ALSF) FAA equipment manufactured by New Bedford Panoramex, so that the circuit card is capable of receiving inputs and sending control signals to the FAA equipment using RS-485 communication.

e) A custom programmable Equipment I/O Interface circuit card may be programmed for communication with MALS/MALSR (medium intensity approach landing system (with runway)) systems using a FSK communications link.

f) A custom programmable Equipment I/O Interface circuit card may be programmed for communication with an NDB (non-directional beacon) system using a FSK communications link.

g) A custom programmable Equipment I/O Interface circuit card may be programmed for communication with a PAPI (precision approach path indicator) system using a FSK communications link.

h) A custom programmable Equipment I/O Interface circuit card may be programmed for communication with a REIL (runway end identifier lights) system using a FSK communications link.

i) A custom programmable Equipment I/O Interface circuit card may be programmed for communication with a RVR (runway visual range) system using a RS-485 CommP and an RS-485 CommS communications link.

j) A custom programmable Equipment I/O Interface circuit card may be programmed for the Thales 420 ILS system, so that the circuit card is capable of receiving inputs from the FAA equipment including RS-232, +13.5 V voltage monitoring, DME (direction monitoring equipment) status signals, Interlock conflict (shutdown) signals and Interlock status signal inputs, and outputs to the FAA equipment including Interlock control, Interlock Enable signals, FFM (far field monitor) bypass signals, and FSK DME (direction monitoring equipment) signals. Digital I/O in this circuit card may include DME reset signal output signals and DME status input signals.

k) A custom programmable Equipment I/O Interface circuit card may be programmed for communication with a VOR (VHF omnidirectional range) system using a FSK communications link.

l) A custom programmable Equipment I/O Interface circuit card may be programmed for communication with a VOT (VOR test facility) system using a FSK communications link.

m) A custom programmable Equipment I/O Interface circuit card may be programmed for digital communication with a MK1F ILS system. The MK1F ILS system may contain from 1 to 4 modules (LOC, a localizer channel for horizontal runway position; GS, a glide slope channel for vertical runway position indication; MM, a "middle marker" channel which indicates the position of the aircraft with respect to the airport usually placed about 5 miles from the airport; OM, "outer marker" channel which indicates the position of the aircraft with respect to the airport usually placed more than 5 miles from the airport) each of which are controlled by tone signals. The programmed Equipment I/O Interface circuit card may send control information (such as on/off signals) and receives status signals digitally to a separate circuit card (e.g., an MK1F RCSU Single Channel Tone/Encoder) for each such active module. This circuit card converts these digital signals to tone signals, which are then conveyed to each item of ILS equipment pertaining to that module. Similarly, Interlock Control and Interlock Enable signals are digitally transmitted to the interlock, while Interlock Status and Interlock Conflict digital signals are received from the interlock by the programmed Equipment I/O Interface circuit card.

n) A custom programmable Equipment I/O Interface circuit card may be programmed for communication with an EG (Engine Generator) system using a FSK communications link. The engine generator is a backup generator used for emergency or auxiliary use in the event of a loss of power from the electrical grid.

o) A custom programmable Equipment I/O Interface circuit card may be programmed for communication with an DVR (Digital Voice Recorder) system using a FSK communications link. The ICMS system may send on/off control signals to the DVR system, and receive "end-of-tape" and/or other status signals from the FAA equipment via the Equipment I/O Interface circuit card.

It will be understood that the present invention is not limited by the embodiments shown, and a person of skill in the art will easily be able to envision alternative embodiments of the programmable Equipment I/O Interface circuit card of the present invention. For example, a I/O Equipment Interface circuit card may comprise communication modules other than, or in addition to, the RS-485, RS-232 and FSK modules described herein for added or different connectivity options.

The present invention is therefore directed to an ICMS Refresh System employing separate dual I/O Processors each connected to Equipment I/O Interface backplanes comprising one or more programmable Equipment I/O Interface circuit cards. The Equipment I/O Interface circuit cards are programmed to provide a customizable translation function between each item of FAA equipment and the I/O Processors. The invention also comprises methods of controlling and monitoring airfield hardware and FAA equipment in a single fault impervious control and monitoring system having customized, programmable interfaces with the items of FAA equipment. The invention further comprises Equipment I/O Interface backplanes comprising one or more programmable Equipment I/O Interface circuit cards, as well as the programmable Equipment I/O Interface circuit cards themselves.

Accordingly, although there has been hereinabove described specific examples of compositions and methods for an ICMS Refresh system, it will be appreciated that the invention is not limited to such examples. That is, one or more features of any example or description may be combined with or deleted from one or more features of any other example or description, and remain within the description of the invention. Any range of temperatures, time, or other measurements that may be described in this specification includes all points and subranges within the high and low measurement of the range listed, to $\frac{1}{10}^{th}$ (one decimal place) of a unit of measurement. The present invention may suitably comprise, consist of, or consist essentially of any recited elements. Accordingly, any and all modifications, variations or equivalent arrangements which may occur to those skilled in the art, should be considered to be within the scope of the present invention as defined in the appended claims.

Each and every publication, webpage, patent and patent publication cited or mentioned in the present specification is hereby specifically incorporated herein by reference in its entirety as a part of the present specification.

What is claimed is:

1. A single-fault-impervious integrated control and monitoring (ICMS) avionic system, comprising:
   a) a plurality of workstations, one of said workstations being a remote Master Workstation;
   b) a pair of I/O Processors interchangeably capable of assuming Active and Standby status, wherein only one I/O Processor is Active and only one I/O Processor is Standby at a given time,
   c) a pair of independent communication paths each interconnecting one of said pair of I/O Processors with said workstations;
   each of said pair of I/O Processors being connected to the other I/O Processor and individually connected to a separate, single I/O subsystem; said I/O subsystem comprising
   d) one or more Equipment I/O backplane comprising a plurality of circuit card slots connecting said one or more Equipment I/O backplane to one or more programmable Equipment I/O Interface circuit cards, each said one or more programmable Equipment I/O Interface circuit card being individually programmed to:
      i) receive control signal data from the I/O Processors, translate said control signal data into a translated control signal data form usable by a specific item of FAA equipment, and send said translated control signal data to said specific item of FAA equipment, and
      ii) receive monitoring signal data from said specific item of FAA equipment, translate said monitoring signal data into a translated monitoring signal data form usable by the I/O Processors, and send said translated monitoring signal data to the I/O Processors;
   said pair of I/O Processors being so interconnected with each other that whenever one of them is in Active status, the outputs of the other are blocked but its inputs continue to function, each of said I/O Processors providing a status signal that is transmitted directly between said I/O Processors.

2. The system of claim 1 wherein said a programmable Equipment I/O Interface circuit card may be disconnected from said one or more Equipment I/O backplane and/or a different programmable Equipment I/O Interface circuit card may be connected to said one or more Equipment I/O backplane without shutting down said ICMS system, said I/O Processors or said one or more Equipment I/O backplane.

3. The system of claim 1, in which a currently Active I/O Processor, upon becoming unable to communicate with said Remote Master Workstation, causes the I/O Processor in Standby Mode to assume Active status if, and only if, said Standby I/O Processor is both operational and in communication with said Remote Master Workstation.

4. The system of claim 3, in which said pair of I/O Processors are connected to each other by three digital I/O data lines; a first line by which it is asserted by the Active I/O Processor when it is online, a second line by which it is asserted by the Standby I/O Processor when it is online, and a third line by which it is asserted by said Standby I/O Processor when it detects a good network path to said Master Workstation.

5. The system of claim 4, in which; said Active I/O Processor, upon becoming unable to communicate with said Master Workstation, while said second and third lines are asserted, releases said first line; said Standby I/O Processor releases said second and third lines in response thereto, and asserts said first line by assuming Active status; and said previously Primary I/O Processor then asserts said second line by assuming Standby status.

6. The system of claim 5, in which said Active Primary I/O Processor, upon becoming unable to communicate with said Master Workstation while said second and/or third line is released, remains in Active Primary status and searches for a Master Workstation until communication with a Master Workstation is restored.

7. The system of claim 1, in which a selected plurality of said workstations are Master Capable Workstations, and in which only one of said Master Capable Workstations at any given time has active Master Workstation status, active status being automatically assumed by another one of said Master Capable Workstations if communication with the currently active Master Workstation is interrupted.

8. The system of claim 1, in which said I/O Processors store in digital form for transmission to said workstations equipment data conveyed to one or more Equipment I/O Interface circuit card in digital format, frequency shift key format, serial data format and/or static composite tone format.

9. The system of claim 1 further comprising a programmable Equipment I/O Interface circuit card electronically structured to be programmed to provide communication linkage between any of a plurality of items of airfield FAA equipment with an airfield integrated control and monitoring (ICMS system, said programmable Equipment I/O Interface circuit card, comprising
   a) a communications port structured to receive data from and transmit data to an ICMS I/O Processor;
   a) a CPU;
   b) a port for loading software instructions into said CPU, said software instructions including I/O signal translation and I/O signal routing directions;
   c) translation modules structured to translate
      i) an output signal received from an ICMS I/O Processor into a translated output signal comprising one or more formats recognized by any of a plurality of items of FAA Equipment, said one or more formats selected from the group consisting of a digital format, a frequency shift key format, a serial data format and a static composite tone format; and
      ii) an input signal, received from any of a plurality of items of FAA Equipment in one or more formats selected from the group consisting of a digital format, a frequency shift key (FSK) format, a serial data format and a static composite tone format to a translated input signal, into a translated input signal comprising a formal recognized by an ICMS I/O Processor; and
   d) a primary communications port (CommP) structured to receive data from and transmit data to any of a plurality of items of FAA Equipment; and
   e) a secondary communications port (CommS) structured to receive data from and transmit data to any of a plurality of items of FAA Equipment.

10. The system of claim 9 wherein, when suitable software instructions are loaded into said CPU, said programmable Equipment I/O Interface circuit card can bidirectionally translate signals between said I/O Processors and said FAA equipment when said FAA equipment requires an I/O communications line sending and receiving:
   a) signals suitable for an RS-485 serial connector,
   b) signals suitable for an RS-232 serial connector,
   c) signals suitable for an FSK connector.

11. The system of claim 9 wherein, when suitable software instructions are loaded into said CPU, said programmable Equipment I/O Interface circuit card can bidirectionally translate signals between said I/O Processors and said FAA equipment when said PAA equipment requires dual I/O communications lines sending and receiving
   a) signals suitable for 2 RS-485 connectors via each of said dual I/O communications lines,
   b) signals suitable for an RS-485 connector via one of said dual I/O communications lines and signals suitable for an RS-232 connector via the other of said dual I/O communications lines,
   c) signals suitable for an RS-485 connector via one of said dual I/O communications lines and signals suitable for an FSK connector via the other of said dual I/O communications lines, or
   d) signals suitable for an RS-232 connector via one of said dual I/O communications lines and signals suitable for an FSK connector via the other of said dual I/O communications lines.

12. The system of claim 9 in which said programmable Equipment I/O Interface circuit card comprises digital I/O channels, pluggable into a connector in the I/O Interface backplane for additional or auxiliary bidirectional digital signal(s) between an item of FAA equipment and said I/O Processors.

13. The system of claim 9 in which said programmable Equipment I/O Interface circuit card comprises digital I/O channels pluggable into a connector in an I/O Interface backplane for additional or auxiliary bidirectional digital signal(s) between an item of FAA equipment and said I/O Processors.

14. The system of claim 9 wherein said plurality of items of airfield FAA equipment comprises one or more items selected from the group consisting of:
   a) a MKIF instrument landing system (ILS),
   b) an engine generator (EG),
   c) a digital voice recorder (DVR),
   d) a precision approach path indicator (PAPI),
   e) runway end identifier lights (REIL),
   f) Runway Visual Range Equipment (RVR),
   g) a Thales 420 ILS,
   h) a Visual Approach Slope Indicator (VASI),
   i) a VHF omnidirectional range (VOR) system,
   j) a VOR test facility (VOT),
   k) a Non-Directional Beacon (NDB),
   l) an MK20 instrument landing system (ILS),
   m) an airport beacon (AB),
   n) an approach lighting system with sequenced flashing lights (ALSF), and
   o) a medium intensity approach lighting systems (MALS/MALSR).

15. An airfield integrated control and monitoring system (ICMS) comprising
   a) a plurality of workstations, one of said workstations being a remote Master Workstation;
   b) a pair of V/O Processors interchangeably capable of assuming Active and Standby status, wherein only one I/O Processor is Active and only one I/O Processor is Standby at a given time,
   c) a pair of independent communication paths each interconnecting one of said pair of I/O Processors with said workstations;
   each of said pair of I/O Processors being communicably connected to the other I/O Processor and individually connected to a separate single I/O subsystem, said I/O subsystem comprising
   d) one or more Equipment I/O backplanes comprising a plurality of circuit card slots connecting each of said one or more Equipment I/O backplanes to one or more programmable Equipment I/O Interface circuit cards, wherein each said programmable Equipment I/O Interface circuit card is electronically structured to be programmed to provide communication linkage between any of a plurality of items of airfield FAA equipment with an airfield integrated control and monitoring (ICSM) system, said programmable Equipment I/O Interface circuit card, comprising
i) a communications port structured to receive data from and transmit data to an ICMS VO Processor;
ii) a CPU;
iii) a port for loading software instructions into said CPU, said software instructions including I/O signal translation and I/O signal routing directions;
translation modules structured to translate iv)
   A) an output signal received from an ICMS I/O Processor into a translated output signal comprising one or more formats recognized by any of a plurality of items of FAA Equipment, said one or more formats selected from the group consisting of a digital format, a frequency shift key format, a serial data format and a static composite tone format; and
   B) an input signal, received from any of a plurality of items of FAA Equipment in one or more formats selected from the group consisting of a digital format, a frequency shift key (FSK) format, a serial data format and a static composite tone format to a translated input signal, into a translated input signal comprising a formal recognized by an ICMS I/O Processor; and
   v) a primary communications port (CommP) structured to receive data from and transmit data to any of a plurality of items of FAA Equipment; and
   v) a secondary communications port (CommS) structured to receive data from and transmit data to any
      of a plurality of items of FAA Equipment;
and wherein each said Equipment I/O Interface circuit card is programmed and connected so as to provide communication linkage between said I/O Processors and an item selected from said plurality of items of FAA equipment.

16. The airfield integrated control and monitoring system (ICMS) of claim 15 wherein said plurality of items of FAA equipment includes one or more items selected from the group consisting of:
a) a MKIF instrument landing system (ILS),
b) an engine generator (EG),
c) a digital voice recorder (DVR),
d) a precision approach path indicator (PAPI),
e) runway end identifier lights (REIL), Runway Visual Range Equipment (RVR),
g) a Thales 420 instrument landing system (ILS),
h) a Visual Approach Slope Indicator (VASI),
i) a VHF omnidirectional range (VOR) system,
j) a VOR test facility (VOT),
k) a Non-Directional Beacon (NDB),
l) an MK20 instrument landing system (ILS),
m) an airport beacon (AB),
n) an Airflo or Godfrey approach lighting system with sequenced flashing lights (ALSF),
o) a New Bedford Paroramex approach lighting system with sequenced flashing lights (ALSF)
o) a medium intensity approach lighting systems (MALS/MALSR).

17. The airfield integrated control and monitoring system (ICMS) of claim 15 in which said programmable Equipment I/O Interface circuit card is capable of bidirectionally translating signals between said I/O Processors and said FAA equipment when said FAA equipment requires an I/O communications line sending and receiving:
a) signals suitable for an RS-485 serial connector,
b) signals suitable for an RS-232 serial connector,
c) signals suitable for an FSK connector.

18. The airfield integrated control and monitoring system (ICMS) of claim 15 capable of bidirectionally translating signals between said I/O Processors and said FAA equipment when said FAA equipment requires dual I/O communications lines sending and receiving
a) signals suitable for 2 RS-485 connectors via each of said dual I/O communications lines,
b) signals suitable for an RS-485 connector via one of said dual I/O communications lines and signals suitable for an RS-232 connector via the other of said dual I/O communications lines,
c) signals suitable for an RS-485 connector via one of said dual I/O communications lines and signals suitable for an FSK connector via the other of said dual I/O communications lines, or
d) signals suitable for an RS-232 connector via one of said dual I/O communications lines and signals suitable for an FSK connector via the other of said dual I/O communications lines.

* * * * *